(12) United States Patent
Hynes et al.

(10) Patent No.: US 6,185,153 B1
(45) Date of Patent: Feb. 6, 2001

(54) SYSTEM FOR DETECTING GUNSHOTS

(75) Inventors: Mark William Hynes, Sierra Vista; James Lee Cole, Tucson, both of AZ (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/525,577

(22) Filed: Mar. 16, 2000

Related U.S. Application Data (63) Continuation of application No. 09/252,906, filed on Feb. 19, 1999.

(51) Int. Cl.[7] .................................................. G01S 3/80
(52) U.S. Cl. ........................ 367/124; 367/118; 367/906
(58) Field of Search .................................. 367/118, 124, 367/129, 906; 381/56

(56) References Cited

U.S. PATENT DOCUMENTS

| | | | |
|---|---|---|---|
| 5,455,868 | * 10/1995 | Sergent et al. | 367/906 |
| 5,504,717 | * 4/1996 | Sharkey et al. | 367/124 |
| 5,703,835 | * 12/1997 | Sharkey et al. | 367/124 |
| 5,917,775 | * 6/1999 | Salisbury | 367/906 |

* cited by examiner

*Primary Examiner*—Ian J. Lobo
(74) *Attorney, Agent, or Firm*—William Randolph; William Medsger; Edward Stolarum (57) ABSTRACT

A system for detecting gunshots includes an input device including a microphone for converting acoustic noises into signals and amplifiers for amplifying the input signals, a threshold detector for receiving the amplified signals and comparing the signals with a predetermined threshold value and for producing an output signal when the threshold value is exceeded. A pulse width detector is connected to the threshold detector for producing an output signal only if the width of the threshold detector output signal is within a predetermined range of values. A pulse count detector is also connected to the threshold detector for producing an output signal when the level of the threshold output signal is above a peak threshold level or the number of threshold level output signals that exceed a threshold level are less than a preset limit. An output device indicates that a gunshot has occurred only when signals are received from the pulse width detector and the pulse count detector during a sampling period.

14 Claims, 6 Drawing Sheets

SYSTEM FOR DETECTING GUNSHOTS

This application is a continuation of Ser. No. 09/252,906 filing date Feb. 19, 1999.

FIELD OF THE INVENTION

This invention generally relates to the detection of gunshots fired from weapons and, more particularly, to the use of a detection system for distinguishing from background environmental noise that a weapon has been fired.

BACKGROUND OF THE INVENTION

In urban or city environments as well as rural locations there is a need by various police, military and civilian activities to identify that a gun or weapon has been fired. There are systems and methods for detecting gunshots.

For example, U.S. Pat. Nos. 5,504,717 and 5,703,835 issued to Sharkey, et. al. disclose security systems for detecting and reporting gunshot events in which a variety of individual detection units are positioned on a plurality of remote, separate pole units. Each pole unit includes a microphone for sensing acoustic signals, a signal conditioning and threshold unit coupled to the microphone, a data acquisition and signal processing unit, a communication unit, and a power supply. The outputs from the pole units are transmitted to a central processor at a base station where time domain differencing techniques are employed to fix the location of the gunshot(s). The signal conditioning and thresholding unit includes a signal comparator for detecting when an output signal from the microphone exceeds a predetermined level, and a peak background level averager that receives signals from both an averager rise time constant circuit and an averager decay time circuit. The averager rise time and averager decay time circuits produce output signals that are representative of time factors, as measured for example in milliseconds, of the acoustic signals sensed by the microphones.

Another system for detecting gunshots or gunfire is set forth in a South African patent application (Application No. 935960 dated Aug. 16, 1993) by Robin L. Foxcroft of FoxCraft Controls. Disclosed is a system for detecting and locating the origin of sounds such as gunfire, and means for reporting the occurrence of such gunfire. The system includes at least one microphone to convert sound waveforms into an intermediate electrical signal, processing means for comparing the intermediate signal produced by the microphone against a known signal, and means for producing an output if the intermediate electrical signal is sufficiently similar to the known signal. Other features include a processing means capable of generating a Fourier transform of an intermediate electrical signal and of comparing the transformed intermediate signal against a Fourier transform a known gunshot, and a memory which stores the transforms of various known signals.

Another acoustic detection method and system for locating the source of a gunshot is set forth in U.S. Pat. No. 5,586,086 issued to Permuy, et.al. The system comprises an antenna having at least three microphones that are spaced apart from each other and connected via a microphone conditioning stage to a processing and display unit. The processing and display unit includes means for processing the signals and for determining the location and possible type of projectile being fired.

Acoustic detection circuits are also disclosed in U.S. Pat. Nos. 4,001,771 issued to Amrine; 4,083,031 issued to Pharo; 4,091,366 issued to Lavallee; 4,279,027 issued to Van Sloun; and 5,046,053 issued to Gilchrist.

SUMMARY OF THE INVENTION

The present invention is directed to a self-contained system and method for detecting sounds from various sources and for detecting that a gun has been fired. The system or apparatus comprises an input section which includes a microphone for converting acoustic pulses into electrical output signals and amplifiers coupled to the microphone for producing an amplified output signal that is adjusted to an appropriate level for further processing. A threshold detector section is connected to the input section for comparing the amplified output signal with a threshold level and for providing an output signal when the amplified output signal exceeds the threshold level.

The gunshot detecting system also includes pulse width and pulse count test sections which are connected to the threshold detector and input sections and which become activated when the amplified output signal exceeds the threshold level. The pulse width detection unit determines the pulse width of the initial acoustic signal that exceeds the threshold level. If the pulse width is within a range of acceptable pulse widths, then an appropriate positive output signal is provided. The pulse count detection unit determines the number of times that the amplitudes of the acoustic pulses approach or exceed a predetermined level during the time interval or sampling period. If, for example, the pulse count is less than a predetermined number, then an appropriate positive output signal is provided. The outputs of the threshold detector, the pulse width detector, and the pulse count detector are coupled to an output section. A gunshot event is detected only if output signals are produced by the threshold detector, the pulse width detector, and the pulse count detector. The output section may contain an indicating device such as a light or an audible alarm.

The method for detecting that a weapon has been fired includes the steps of detecting acoustic signals and converting the acoustic signals to electrical signals, and then comparing the electrical signals with a predetermined threshold level. When the threshold level is exceeded, the signals are sampled and analyzed for a predetermined period of time to determine the number of threshold output signals which exceed the threshold level within a predetermined period of time. The signals are also sampled and analyzed to determine the pulse width of the initial signal which exceeds the threshold level during the sampling period. A predicted gunshot event is expected to occur when the pulse width of a signal is within a predetermined range and the number of pulse counts which approach a threshold level within a time period are below a prescribed number.

The above brief description sets forth rather broadly the more important features of the present invention in order that the detailed description thereof that follows may be better understood, and in order that the present contribution to the art may be better appreciated. There are, of course, additional features of the invention that will be described and which will form the subject matter of the claims appended hereto.

Accordingly, it is one object of the present invention to provide a compact acoustic detection apparatus which is of self-contained, efficient design that is capable of readily detecting gunshots.

Another object of the present invention is to provide a relatively simple gunshot detection system and method which can be readily adapted to a variety of different environments.

It is another object of the present invention to provide a new and improved gunshot detection method and system of reliable design and which may be easily manufactured and marketed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

Other objects and advantages of the invention will become apparent upon reading the following detailed description with reference to the attached drawings, wherein.

DETAILED DESCRIPTION OF THE INVENTION

Figure 1:
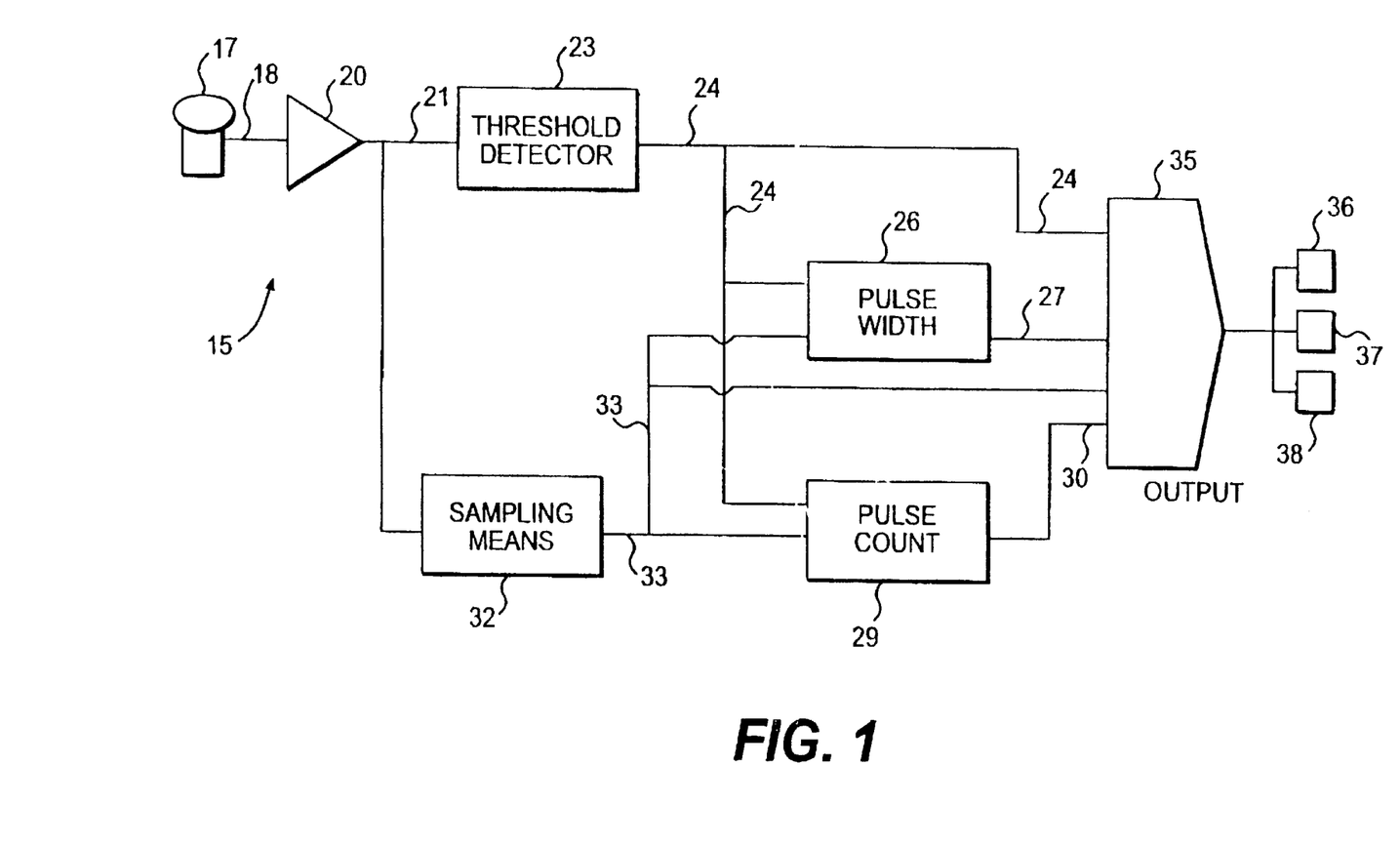
FIG. 1 is a general schematic block diagram of a gunshot detector.

Referring now to FIG. 1 of the drawings, there is generally shown a gunshot detector 15 of the present invention for analyzing acoustic waves or pulses and for discriminating between a gunshot and other loud noises. Gunshot detector 15 includes an input section consisting of a microphone 17 and amplifier 20. Microphone 17 receives acoustic waves or pulses from a variety of different sources of sounds, such as from a gunshot, an automobile horn, or passing traffic, and providing an electrical output signal 18 in response to the sounds. Amplifier 20 is connected to the microphone for receiving the electrical output signals 18 from the microphone and for amplifying the output signals 18 to produce an amplified output signal 21 which is adjusted to a desired level for further processing. The amplified signal 21 is fed to a threshold detector 23 to determine if the level of the amplified signal 21 exceeds a minimum threshold level.

If the output of the threshold detector 23 exceeds a predetermined value, such as would occur with a gunshot, then a threshold detector output signal 24 is produced. The threshold detector signal 24 is fed directly to an output section 35. Threshold detector 23 is also connected to a pulse width detection unit 26 and a pulse count detection unit 29.

Figure 2:
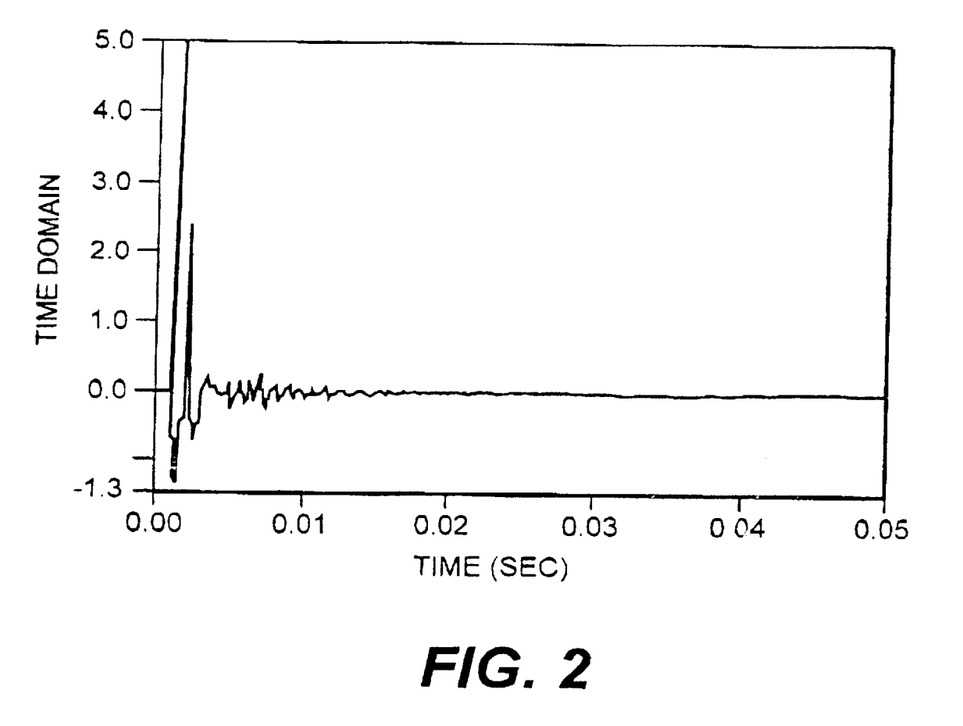
FIG. 2 is a general time domain graph generally depicting an acoustic signal for a gunshot.

The amplified signal 21 is also coupled to a waveform sampling unit 32, which continuously tracks the acoustic pulses impinging upon the microphone 17. The sampling unit 32 provides output signals 33 which are fed to the pulse width unit 26, pulse count unit 29, and output 35. A general depiction of a type of acoustic signal expected to be associated with a gunshot is generally shown in FIG. 2. The sampling unit 32 tracks the waveforms representing the acoustic signals received by microphone 17 and provides this data to the pulse width unit 26 to correlate and determine the pulse width of the initial waveform which exceeded the threshold level, for a predetermined period of time. If this initial pulse width 36 measured by the pulse width unit 26 is within a predetermined range, then the pulse width unit 26 provides an appropriate positive output signal 27 to output section 35.

Pulse count unit 29 analyzes the waveform signals received from the sampling unit 32 to determine the number of pulses or peaks that exceed a threshold level within a given sampling period. Accordingly, pulse count unit 29 determines the number of complete waveforms occurring within a predetermined period of time which have peaks that approach a threshold level. If this number of waveforms or pulses is below a predetermined number, then the pulse count unit 29 provides a positive output signal 30 to the output section 35.

If the threshold detector 23, the pulse width unit 26, and the pulse count unit 29, produce their appropriate positive output signals during a sampling period, then an output signal is produced by the output section 35. This is indicative that a gunshot or other acoustic event that produces a similar waveform pattern has occurred. The waveform shown in FIG. 2 has an initial waveform and subsequent decaying waveforms of much smaller characteristics, such as the width of the waveform. The characteristic pattern of a gunshot waveform allows a gunshot to be distinguished from other sources of noise expected to be heard by police personnel, such as, automobile and truck traffic, emergency vehicles, horns, thunder, barking dogs, etc.

The output signal from output section 35 can be connected to an indicating means in the form of a light 36 or an audible alarm 37. Additionally, a transmitter 38 can be connected to the cutout section 35 so that indication that a weapon has been fired in the vicinity of the device can be transmitted, for example, to a police station, other police cars, or a security agency.

The relatively simple, efficient design of the gunshot detector 15, particularly enables the detection of a gunshot to be accomplished at the detector 15 itself, rather than transmitting the detected signals to remote sites for processing.

FIGS. 3 through 6 show a detailed schematic diagram of a gunshot detector 45 to illustrate particular aspects of the present invention. The gunshot detector circuit of FIGS. 3 through 6 generally includes input, threshold, pulse count test, pulse width test, and output sections. The input section 46 shown in FIG. 3 includes a microphone 47, which receives sound waves and converts them into electrical signals. Resistor 48 is used to bias the microphone 47, and a capacitor 49 functions to block the DC components of the signal. The biased signal from the microphone 47 is then split into two signal paths and applied to amplifiers 51 and 55 which condition the signals before they are respectively fed to a pulse count test section 106 shown in broken lines in FIG. 5, and a threshold section 61, shown in broken lines in FIG. 3. Amplifier 51 is coupled with resistors 52, 53 and amplifier 55 is coupled with resistors 56, 57 to adjust the signals from the microphone to an appropriate voltage level for further processing. The gain of amplifier 51 is determined by the ratio of resistors 52 to 53, which for this design, was selected to be 7.5. Similarly, the gain of amplifier 55 is determined by the ratio of resistors 56 to 57, which was selected to be 10.

Figure 3:
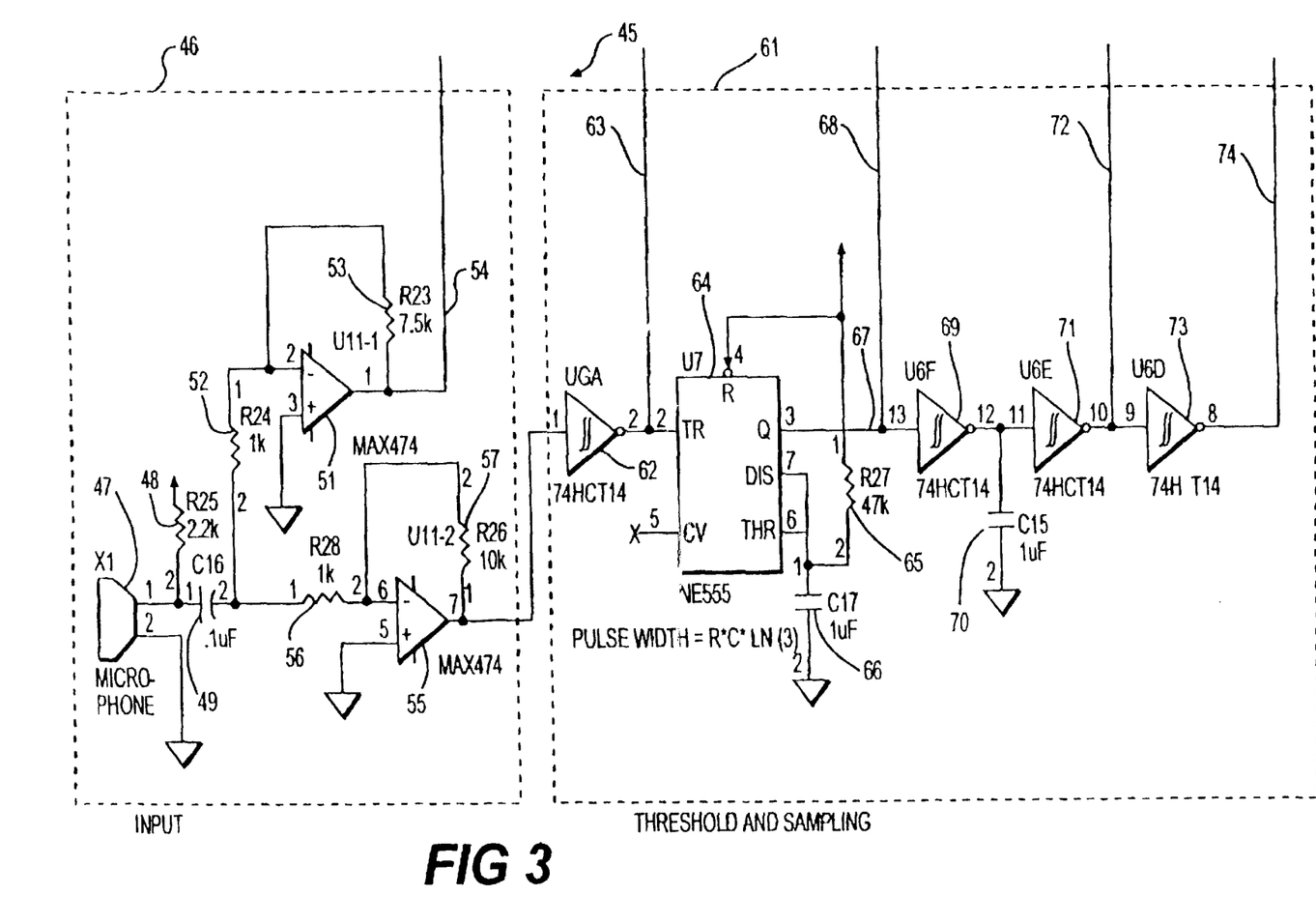
FIG. 3 is a detailed schematic of a particular embodiment of the invention showing an input and a threshold section.

The threshold section 61 of FIG. 3 includes a Schmitt trigger 62, such as part number 74HCT14 made by Harris, and a square wave generator 64, such as part number C555 made by Fairchild Semiconductor. The output signal of the Schmitt trigger 62 remains at a low or zero state until the voltage signal from amplifier 55 exceeds a predetermined voltage level of the Schmitt trigger 62. When this occurs, such as with the occurrence of a loud noise or gunshot, the output from the Schmitt trigger 62 produces an output signal that activates the square wave generator 64. An output signal from Schmitt trigger 62 is also fed to the pulse width test circuit 81 and the pulse count test section 106 along output lines 63 and 82 in FIGS. 4 and 5. The square wave generator 64 produces a square wave signal, which represents the width of the sampling "window" or sampling period, and which is modified by the values of resistor 65 and capacitor 66. The square wave signal produced by square wave generator 64 is directed to output line 68 that is connected to the pulse width test circuit 81 and the pulse count test section 106. The output signal from square wave generator 64 is fed to a series of signal inverters 69, 71, and 73. A capacitor 70 is used to modify the width of the signal from inverter 69 before it is fed to a second signal inverter 71.

Figure 5:
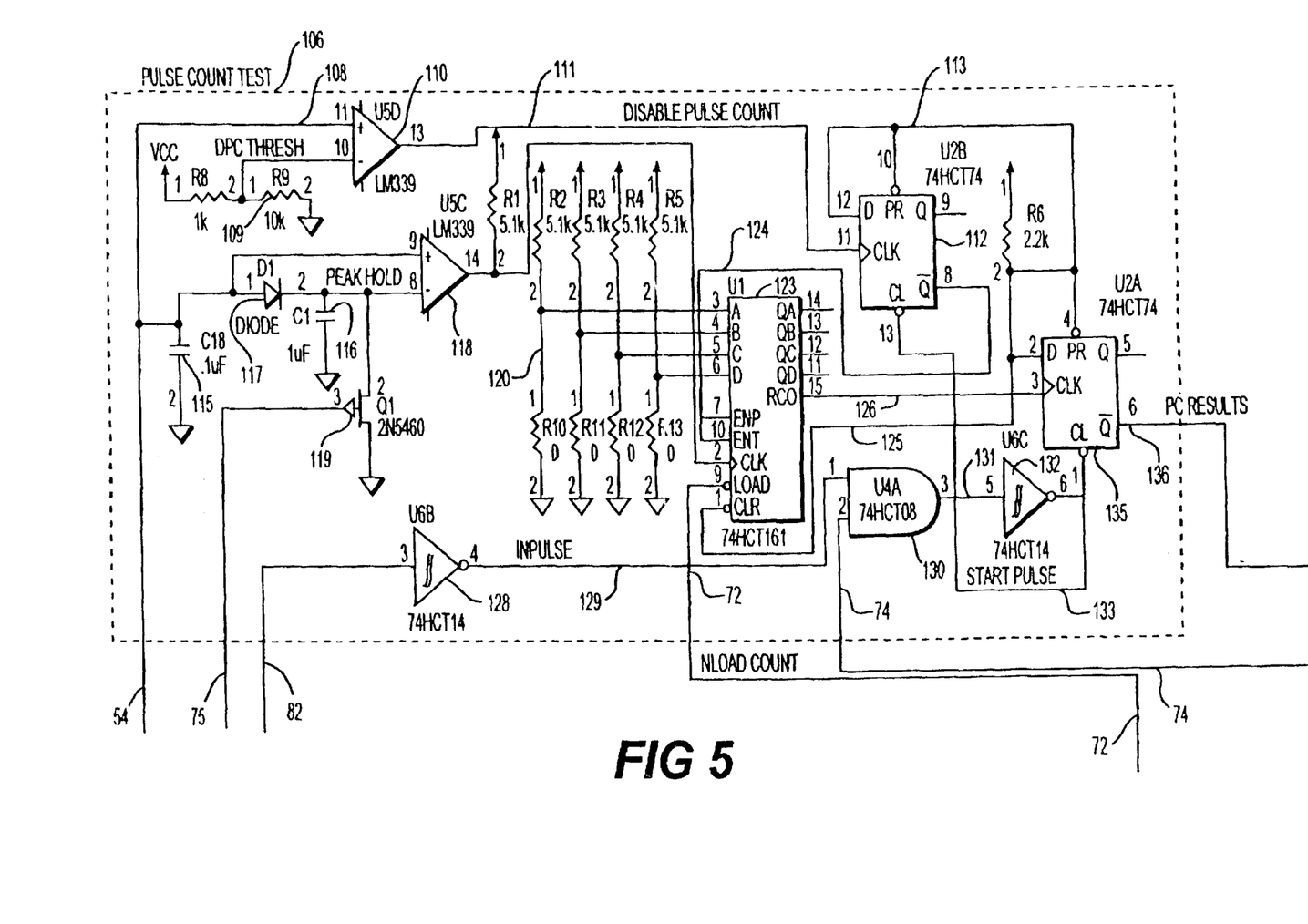
FIG. 5 is a detailed schematic of a pulse count test section of a particular embodiment of the invention.
Figure 6:
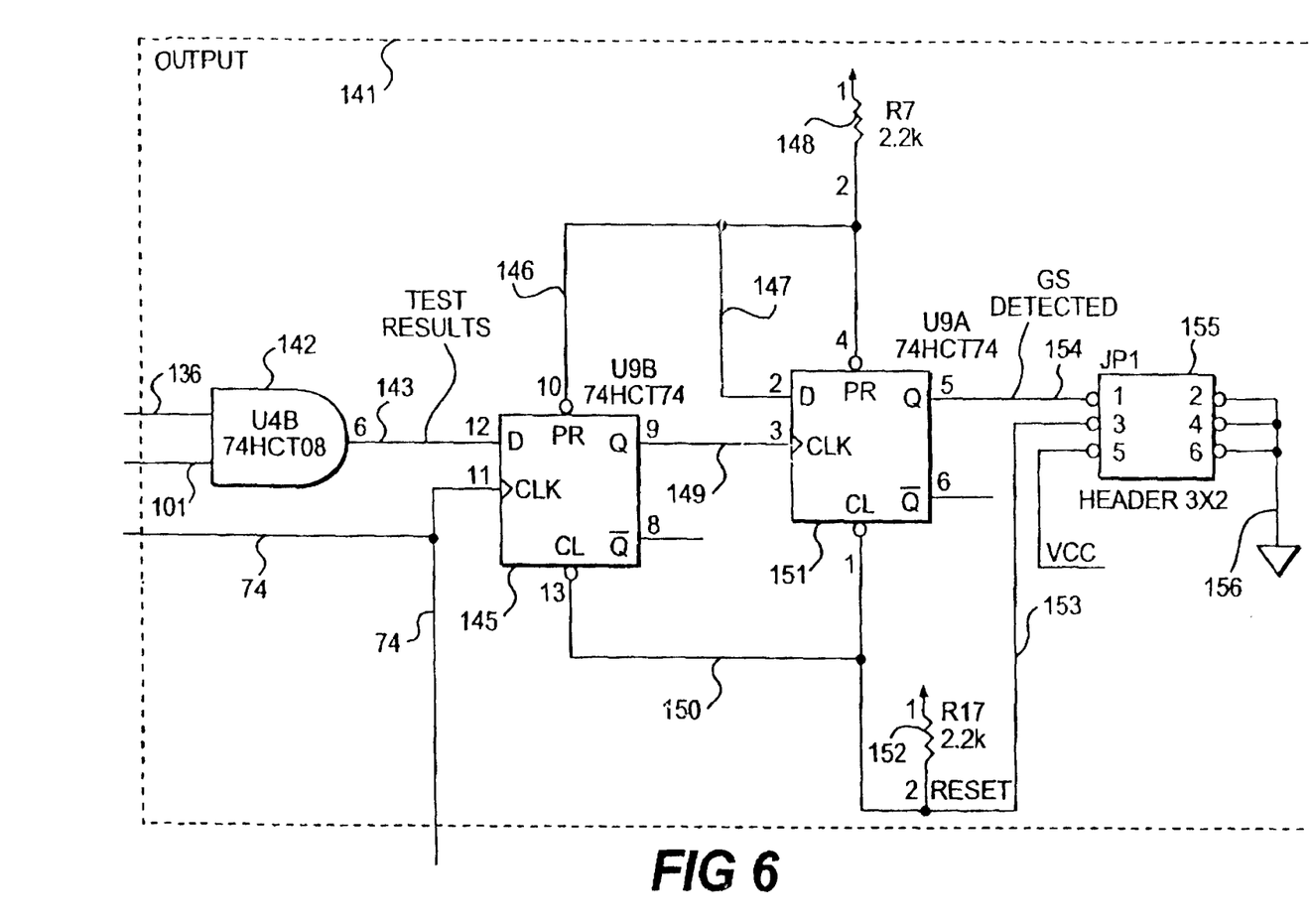
FIG. 6 is a detailed schematic of an output section of a particular embodiment of the invention.

An output signal from the second signal inverter 71 is fed to output line 72, which is directed to the pulse count test section 106, and a third signal inverter 73, which produces an output signal that is directed to the output section 141. The input section 46 and the threshold section comprise an input means for converting acoustic noises into signals and for providing an output signal for the pulse width and pulse count sections when the signals exceed a predetermined threshold level.

Figure 4:
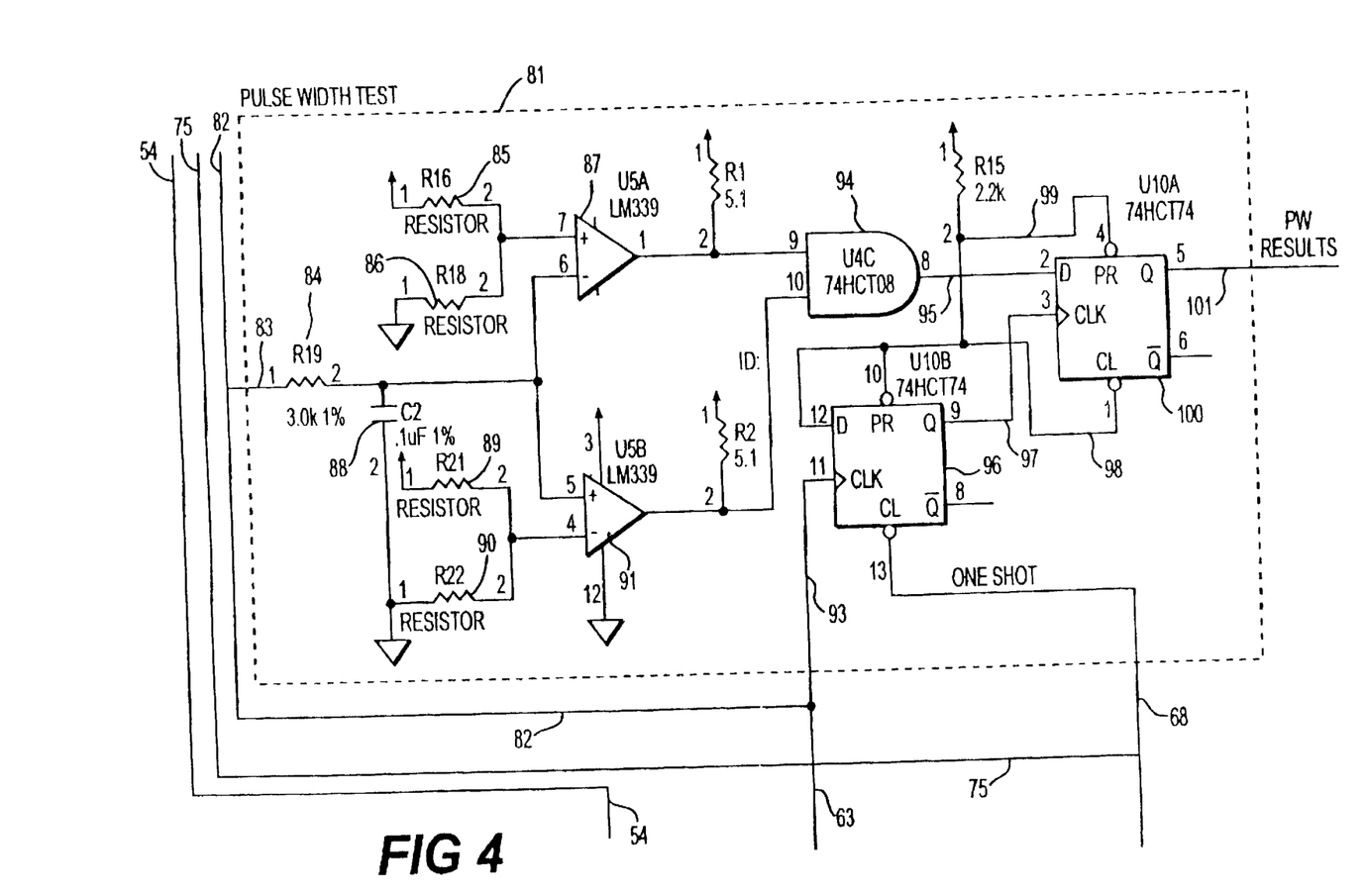
FIG. 4 is a detailed schematic of a pulse width test section of a particular embodiment of the invention.

The pulse width test circuit 81 of FIG. 4 determines if the time width of the initial pulse falls within a predetermined range of time periods that would be indicative of a gunshot. Output signals from the Schmitt trigger 62 are fed to comparators 87 and 91 on lines 63, 82, and 83, and to flip flop 96 on lines 63, 93. Comparator 87 utilizes resistors 85, 86 to effectively establish the upper limit of acceptable pulse widths. Comparator 91 is used to set the lower limit of acceptable pulse widths. The circuit for comparator 91 includes resistors 89, 90 and the rise time of the RC time constant of resistor 84 and capacitor 88. Comparators 87 and 91 both produce logic states of one(1) for AND gate 94 only when the voltage signal is between a lower limit set by the circuit of comparator 91 and an upper limit set by the circuit of comparator 87. Thus, AND gate 94 produces a logic output signal of one for flip flop 100 only during a valid pulse width, or where acceptable outputs are provided from comparators 87 and 91. Flip flop 96 receives an initial voltage signal on input line 63 generated by the Schmitt trigger 62 and a subsequent or clearing voltage signal on line 68 resulting from the square wave generator 64. The falling edge of the clearing pulse clocks the results of the flip-flop 96 which clocks the results of the pulse width test(one for valid pulse width test, zero for invalid pulse width test) through the flip flop 100.

The pulse count test circuit 106 of FIG. 5 counts the number of pulses which occur during the sampling period or sample window. A valid gunshot will have relatively few pulses, while other types of loud signals may result in a larger pulse count that will result in a negative gunshot indication. However, a gunshot which occurs at close range to the device may result in a large acoustic signal and accompanying echoes, resulting in accompanying large pulse counts. To accommodate this type of situation where the user of the device may be imperiled, an output signal from amplifier 51 is fed to amplifier 110 along lines 54 and 108. For those instances where a high voltage input signal results from a nearby gunshot, the input signals processed by amplifier 51 are fed to amplifier 110 along lines 54 and 108. A variable resistor 109 is used to establish a predetermined upper threshold level. If the input signal level exceeds the predetermined upper threshold level, amplifier 110 produces an output signal 111 to disable flip flop 112 and provide a positive gunshot result of the pulse count test along line 113.

In the pulse count test circuit 106, capacitors 115 and 116, diode 117, and comparator 118 function as a comparison device which act together as a peak hold circuit while the transistor 119 provides a signal for resetting the peak hold circuit. This peak hold circuit normalizes the detection of pulses to the level of the initial gunshot pulse. Subsequent pulses are counted only if they approach or exceed the initial pulse amplitude. The resistors 120 are used to set the acceptable pulse count limit and the digital counter device 123, counts the number of pulses which occur during the sampling window or sampling period. An output signal from the signal inverter 71 is fed to digital counter 123 to activate the counter. If the pulse count limit is exceeded during the sampling period, the ripple-carry-out signal on the counter 123 is asserted. This clocks a logic state of one into the flip flop 135 resulting in a logic state zero for the pulse count results, which are fed to AND gate 142 on line 136. The output signal from Schmitt trigger 62 is also fed to inverter amplifier 128 which provides an output signal to AND gate 130 along line 129. A signal from signal inverter 73 is also fed to AND gate 130 along line 74.

In the output section 141 of FIG. 6, the results of the pulse width test 81 and the pulse count test 106 at the end of the sampling window are fed to AND gate 142. Normally, both a valid pulse count and a valid pulse width test must occur for a positive gunshot indication to pass the AND gate 142. A flip-flop 145 receives signals from the AND gate 142 on line 143 and from the signal inverter 73 on line 74. The flip flop 151 is intended to verify the test results and a positive gunshot is sent to output device 155 on line 154. The indication that a gunshot has occurred remains in flip-flop 151 until the user resets the device by grounding pin 3 of output device 155. This configuration is suitable for interfacing with an alarm system, lights, buzzers, or an external microprocessor, generally represented by number 156. It is also contemplated that the output device can be configured to transmit or communicate the test results to an external indicator at a remote location.

It should be understood that the foregoing description is only illustrative of the invention and that various alternatives and modifications can be made by those skilled in the art without departing from the principles and concepts of the invention. Accordingly, the present invention is intended to encompass all such alternatives, modifications, and variations which fall within the appended claims.

What is claimed is:

1. An apparatus for detecting and analyzing acoustic noises to determine when a gun has been fired, comprising;

a microphone for receiving acoustic signals and for providing an output signal in response to the acoustic signals;

amplifier means connected to the microphone for receiving the output signal from the microphone and for amplifying the output signal from the microphone to produce an amplified output signal;

a threshold detector connected to the amplifier means for comparing the amplified output signal with a predetermined value and for providing a threshold detector output signal when the amplified output signal exceeds the predetermined value;

a sampling means connected to the amplifier means for receiving the amplified output signal and for providing a sampling signal representative of a sampling period for the amplified output signal;

a pulse width detector connected to the threshold detector and the sampling means for receiving the threshold detector output signal and for determining if the width of the threshold detector output signal is within a predetermined range of values during the sampling period and for producing an output signal when the width of the threshold detector output signal is within the predetermined range of values;

a pulse count detector connected to the threshold detector and the sampling means for receiving the amplified output signal and for producing an output signal when the number of amplified output signals which exceed a threshold level are less than a preset limit during the sampling period; and an output device connected to the threshold detector, the sampling means, the pulse width detector, and the pulse count detector for providing an output signal indicating that a gun has been fired when output signals have been received from the pulse width detector and pulse count detector.

2. The apparatus according to claim 1, wherein the pulse width detector comprises a first comparator for determining if the value of the threshold detector output signal is above a preset lower value, a second comparator for determining if the value of the threshold detector output signal is below a preset upper level, and a combining means connected to the first and second comparators for providing a combining means output signal when the value of the threshold detector output signal is above the preset lower value and below the preset upper value.

3. The apparatus according to claim 2, wherein the combining means comprises an AND gate and the pulse width detector further comprises a signal holding device connected to the AND gate for receiving the output signal from the AND gate and for holding the output signal until the end of the sampling period.

4. The apparatus according to claim 1, wherein the pulse count detector comprises a peak hold device connected to the amplifier means for receiving the amplified output signals from the amplifier means and for during the sampling period comparing the value of the initial amplified output signal with the values of subsequent amplified output signals received during the sampling period and for providing an output signal when a threshold level established by the initial amplified output signal during the sampling period is approached.

5. The apparatus according to claim 4, wherein the pulse count detector further comprises a counter connected to the peak hold device for during a sampling period counting the number of subsequent amplified output signals that approach the threshold level established by the initial amplified output signal during the sampling period, and the counter providing an output signal for a sampling period if the number of counted signals is below a specified number.

6. The apparatus according to claim 5, wherein the pulse count detector further comprises a threshold level detector connected to the amplifier means for comparing the amplified output signals with a peak threshold level and for disabling the counter and for providing an output signal when the peak threshold level is exceeded.

7. The apparatus according to claim 4, wherein the pulse count detector further comprises a threshold level detector connected to the amplifier means for comparing the amplified output signals with a peak threshold level and for providing an output signal for the pulse count detector when the peak threshold level is exceeded.

8. The apparatus according to claim 1, wherein the output device comprises an AND gate connected to the pulse width detector and the pulse count detector for providing an output signal when signals are received from the pulse width detector and the pulse count detector during the sampling period.

9. The apparatus according to claim 8, wherein the output device further comprises an indicator connected to the AND gate for indicating that a gun has been fired when an output signal has been received from the AND gate.

10. An apparatus for detecting and analyzing acoustic noises to determine when a gun has been fired, comprising;

an input device for converting acoustic noises into output signals and for amplifying the output signals;

a first threshold detector connected to the input device for providing a threshold detector output signal when the value of the amplified output signal exceeds a predetermined value;

a pulse width detector connected to the first threshold detector for producing an output signal when the width of the threshold detector output signal is within a predetermined range of values during a sampling period;

a pulse count detector connected to the first threshold detector for producing an output signal when the number of amplified output signals that exceed a threshold level are less than a predetermined number during a sampling period; and an output device connected to the pulse width detector, and the pulse count detector for providing an output signal indicating that a gun has been fired when output signals have been received from both the pulse width detector and the pulse count detector.

11. The apparatus according to claim 10, wherein the pulse count detector comprises a peak hold device connected to the input device for comparing the initial amplified output signal during a sampling period with subsequent amplified output signals received during the sampling period and for providing an output signal when the threshold level is approached.

12. The apparatus according to claim 11, wherein the pulse count detector includes a second threshold detector connected to the input device for comparing the amplified output signals with a peak level and for providing an output signal for the pulse count detector when the peak threshold level is exceeded.

13. The apparatus according to claim 12, wherein the output device further comprises an indicator for indicating that a gun has been fired when output signals are received from the pulse count detector and the pulse width detector.

14. A method for detecting the firing of a gun, comprising the steps of:

detecting acoustic signals with a microphone device and converting the acoustic signals into output signals;

determining if the amplitude of the output signals exceed a predetermined threshold value;

sampling the output signals that exceed the predetermined threshold value for a predetermined period of time;

detecting the pulse count of the number of sampled output signals detected during the predetermined period of time that have amplitudes which exceed a predetermined level;

detecting the pulse width of the output signals detected during the predetermined period of time; and determining that a possible gunshot event has occurred when the pulse widths of a sampled output signal during the predetermined period of time is within a particular range of values and the pulse count of the sampled output signals during the predetermined period of time is below a particular number.

* * * * *

UNITED STATES PATENT AND TRADEMARK OFFICE
CERTIFICATE OF CORRECTION

PATENT NO. : 6,185,153 B1
DATED : February 6, 2001
INVENTOR(S) : Mark William Hynes and James Lee Cole It is certified that error appears in the above-identified patent and that said Letters Patent is hereby corrected as shown below:

<u>Title page,</u>
Item [73], Assignees, please change to -- The United States of America as represented by the Secretary of the Army, Washington, DC (US) --

Signed and Sealed this

Twenty-eighth Day of June, 2005

JON W. DUDAS
*Director of the United States Patent and Trademark Office*